(12) United States Patent
York et al.

(10) Patent No.: US 12,330,935 B2
(45) Date of Patent: Jun. 17, 2025

(54) SYSTEMS AND METHODS FOR GENERATING OZONE

(71) Applicant: Preservation Tech LLC, Hull, IA (US)

(72) Inventors: Kevin York, Joplin, MO (US); Sannel Patel, Hull, IA (US)

(73) Assignee: Preservation Tech LLC, Hull, IA (US)

( * ) Notice: Subject to any disclaimer, the term of this patent is extended or adjusted under 35 U.S.C. 154(b) by 0 days.

(21) Appl. No.: 17/369,737

(22) Filed: Jul. 7, 2021

(65) Prior Publication Data
US 2022/0009777 A1 Jan. 13, 2022

Related U.S. Application Data

(60) Provisional application No. 63/048,773, filed on Jul. 7, 2020.

(51) Int. Cl.
*C01B 13/11* (2006.01)
*H01T 19/00* (2006.01)

(52) U.S. Cl.
CPC .............. *C01B 13/11* (2013.01); *H01T 19/00* (2013.01); *C01B 2201/12* (2013.01); *C01B 2201/22* (2013.01); *C01B 2201/32* (2013.01)

(58) Field of Classification Search
CPC ..... C01B 13/10; C01B 13/11; C01B 2201/20; C01B 2201/22; C01B 2201/24; C01B 2201/62; C01B 2201/64; C01B 2201/82; C01B 2201/84; C01B 2201/72; C01B 2201/74; C01B 2201/76; C01B 13/115; C01B 2201/14; C01B 2201/10; C01B 2201/90; C01B 2201/12; C01B 2201/32; C01B 2201/66; C01B 2201/60; C01B 2201/34; H01T 19/00; H01T 19/02;
(Continued)

(56) References Cited

U.S. PATENT DOCUMENTS 3,942,020 A * 3/1976 Ciambrone ............. C01B 13/11
422/186.18
5,766,560 A * 6/1998 Cole ....................... B01J 19/088
422/907
(Continued)

OTHER PUBLICATIONS

Plasma Technics Inc. ("a complete line of ozone generating products" Year: 2018) link: https://www.plasmatechnics.com/assets/content/files/pdf-s/pti-plasma-block-catalog.pdf?=1518545254 (Year: 2018).*
(Continued)

*Primary Examiner* — Xiuyu Tai
(74) *Attorney, Agent, or Firm* — Dentons Davis Brown; Matthew Coryell (57) ABSTRACT

An ozone generating cell includes a corona discharge chamber with a curved side wall. The cell includes a high-voltage electrode, a ground electrode, and a dielectric material positioned between the high-voltage electrode and the ground electrode. The cell includes a gas channel formed between the dielectric material and the ground electrode. The channel has a first end in fluid communication with a gas opening in the dielectric material, which is in fluid communication with a gas port. The channel has a second end in fluid communication with another gas port. The channel further includes multiple concentric segments between the first and second ends of the channel.

20 Claims, 7 Drawing Sheets

(58) Field of Classification Search
CPC ......... H01T 19/04; B01J 19/08; B01J 19/088; H05H 1/2406; H05H 2245/15; H05H 2240/20; H05H 1/46; H05H 1/466; C02F 2201/782; C02F 1/4608; C02F 1/78
See application file for complete search history.

(56) References Cited

U.S. PATENT DOCUMENTS

2012/0308440 A1* 12/2012 Owens .................... C01B 13/11
 29/829
2018/0297844 A1* 10/2018 Rodan .................. H05H 1/2406

OTHER PUBLICATIONS

Portugal et al. (S Portugal, S Roy, J Lin, Functional relationship between material property, applied frequency and ozone generation for surface dielectric barrier discharges in atmospheric air, Sci Rep 7 (2017) 6388:1-11) (Year: 2017).*

* cited by examiner

SYSTEMS AND METHODS FOR GENERATING OZONE

CROSS-REFERENCE TO RELATED APPLICATION(S)

This application claims the benefit under 35 U.S.C. § 119(e) to U.S. Provisional Application 63/048,773, filed Jul. 7, 2020 and entitled "Systems and Methods for Generating Ozone," which is hereby incorporated herein by reference in its entirety.

TECHNICAL FIELD

The disclosed technology relates generally to ozone generation.

BACKGROUND

Ozone has long been used as a broad-spectrum biocide against microorganisms. The triatomic form of ozone and its ability to oxidize microorganisms has been applied as a disinfectant in many settings, including, for example, to treat water, kill food bacteria, clean laundry and other fabrics, decontaminate hospital operating rooms, and deodorize air and objects after, for example, a fire.

Ozone is made by adding energy to oxygen molecules ($O_2$), which causes oxygen atoms to split apart. In some cases, these single oxygen atoms temporarily combine with other oxygen molecules to create ozone molecules ($O_3$). This process naturally occurs in response to lightning and sun light. Ozone can be artificially produced through the same mechanisms, by splitting diatomic oxygen molecules with energy from corona discharge or ultraviolet light. Ozone generators have typically incorporated one of these techniques to produce ozone that can be used as a disinfectant for both small- and large-scale applications. As the need for disinfecting agents continues in residential, commercial, and industrial settings, there is also a continued desire to improve ozone generators and methods for generating ozone.

SUMMARY

This disclosure generally relates to generating ozone through corona discharge. Examples of the disclosed technology include ozone generators, ozone generating cells, and methods of generating ozone through corona discharge.

An ozone generating cell is provided according to one aspect of the disclosure. The ozone generating cell includes a first gas port, a second gas port, a power connection, and a corona discharge chamber. The corona discharge chamber includes a curved side wall, a high-voltage electrode electrically coupled to the power connection, a ground electrode, a dielectric material positioned between the high-voltage electrode and the ground electrode, and a gas channel formed between the dielectric material and the ground electrode. The dielectric material includes a gas opening in fluid communication with the first gas port. The gas channel includes a first end in fluid communication with the gas opening in the dielectric material, a plurality of concentric segments, and a second end in fluid communication with the second gas port.

Various implementations of the ozone generating cell include one or more of the following features and/or elements. In some cases the curved side wall forms a cylindrical side wall of the corona discharge chamber. In some cases the ground electrode is connected to the curved side wall and forms an end wall of the corona discharge chamber. In various cases the ozone generating cell further includes one or more channel walls and the gas channel is defined by the dielectric material, the one or more channel walls, and the ground electrode.

According to another aspect of the disclosure an ozone generating cell is provided. The ozone generating cell includes a first gas port, a second gas port, a power connection, and a corona discharge chamber. The corona discharge chamber includes first and second ground electrodes and a curved side wall extending between the first ground electrode and the second ground electrode, thereby defining an interior of the chamber. The cell further includes a high-voltage electrode electrically coupled to the power connection, a first dielectric plate positioned between the high-voltage electrode and the first ground electrode, and a second dielectric plate positioned between the high-voltage electrode and the second ground electrode. The first dielectric plate includes a first gas opening in fluid communication with the first gas port and the second dielectric plate includes a second gas opening in fluid communication with the first gas port. The ozone generating cell further includes a first gas channel formed between the first dielectric plate and the first ground electrode and a second gas channel formed between the second dielectric plate and the second ground electrode. The first gas channel includes a first end in fluid communication with the first gas opening, a plurality of concentric segments, and a second end in fluid communication with the second gas port. The second gas channel includes a first end in fluid communication with the second gas opening, a plurality of concentric segments, and a second end in fluid communication with the second gas port.

Various implementations of the ozone generating cell include one or more of the following features and/or elements. In various cases the curved side wall forms a cylindrical side wall of the corona discharge chamber. In some cases the first ground electrode forms a first end wall of the corona discharge chamber and the second ground electrode forms a second end wall of the corona discharge chamber. In various cases the ozone generating cell further includes one or more first channel walls and one or more second channel walls. In some such cases the first gas channel is defined by the first dielectric plate, the one or more first channel walls, and the first ground electrode, and the second gas channel is defined by the second dielectric plate, the one or more second channel walls, and the second ground electrode.

An ozone generator is provided according to another aspect of the disclosure. The ozone generator includes a support frame, an ozone generating cell mounted to the support frame, and power circuitry mounted to the support frame. The ozone generating cell includes a first gas port, a second gas port, a power connection, and a corona discharge chamber. The corona discharge chamber includes a curved side wall, a high-voltage electrode electrically coupled to the power connection, a ground electrode, a dielectric material positioned between the high-voltage electrode and the ground electrode, and a gas channel formed between the dielectric material and the ground electrode. The power circuitry is electrically coupled to the power connection of the ozone generating cell. The dielectric material includes a gas opening in fluid communication with the first gas port. The gas channel includes a first end in fluid communication with the gas opening in the dielectric material, a plurality of concentric segments, and a second end in fluid communication with the second gas port.

Various implementations of the ozone generating cell include one or more of the following features and/or elements. In various cases the power circuitry is configured to supply the ozone generating cell with more than 600 watts of electricity. In some cases the power circuitry is configured to supply the ozone generating cell with between 600 watts and 1200 watts of electricity. In some cases the ozone generating cell is configured to generate an amount of ozone that varies depending upon an amount of power supplied by the power circuitry. In some cases the ozone generating cell and the power circuitry are configured to generate ozone at two or more rates. In some such cases the two or more rates include at least two of 40 grams/hour of ozone, 60 grams/hour of ozone, and 100 grams/hour of ozone. In various implementations the curved side wall forms a cylindrical side wall of the corona discharge chamber. In some cases the ground electrode is connected to the curved side wall and forms an end wall of the corona discharge chamber. In some cases the ozone generator includes one or more channel walls and the gas channel is defined by the dielectric material, the one or more channel walls, and the ground electrode.

According to various implementations of the ozone generator, the ground electrode is a first ground electrode and the corona discharge chamber further includes a second ground electrode. The curved side wall extends between the first ground electrode and the second ground electrode, thereby defining an interior of the chamber. The dielectric material with the gas opening includes a first dielectric plate with a first gas opening in fluid communication with the first gas port. The first dielectric plate is positioned between the high-voltage electrode and the first ground electrode. The corona discharge chamber also includes a second dielectric plate with a second gas opening in fluid communication with the first gas port. The second dielectric plate is positioned between the high-voltage electrode and the second ground electrode. Further, the gas channel is a first gas channel formed between the first dielectric plate and the first ground electrode. The first end of the first gas channel is in fluid communication with the first gas opening. In addition, the corona discharge chamber further includes a second gas channel formed between the second dielectric plate and the second ground electrode. The second gas channel includes a first end in fluid communication with the second gas opening, a plurality of concentric segments, and a second end in fluid communication with the second gas port.

According to another aspect of the disclosure, a method of generating ozone includes varying the ozone generation rate of an ozone generator according to the disclosed technology by varying the amount of power supplied to the ozone generating cell by the power circuitry. In various implementations the method of generating ozone also includes varying the ozone generation rate of the ozone generator by varying the frequency of the power supplied to the ozone generating cell by the power circuitry.

DETAILED DESCRIPTION

This disclosure generally describes embodiments that relate to generating ozone through corona discharge. Examples of the disclosed technology include ozone generators, ozone generating cells, and methods of generating ozone that use corona discharge to split diatomic oxygen molecules to temporarily form triatomic ozone molecules useful as a disinfectant.

According to one aspect of the disclosure, an ozone generator or ozone generating cell includes a corona discharge chamber having a curved side wall. A cylindrical side wall is one possible example of a curved side wall. In some cases, the discharge chamber includes one or more paths or channels for gas to flow during corona discharge. In some cases, the one or more paths can provide the flowing gas with greater exposure to the corona discharge during operation, which in some cases may advantageously result in greater ozone production.

According to another aspect of the disclosure, an ozone generator includes an ozone generating cell and power circuitry configured to supply the cell with electricity for generating the corona discharge. In some examples, the power circuitry is configured to vary the amount of electrical power supplied to the ozone generating cell to provide a variable rate of ozone production. In some cases, the power circuitry may supply the ozone generating cell with a range of electrical power amounts. As an example, the power circuitry may be configured to provide the ozone generating cell with two or more discrete amounts of power within the range, thus providing a corresponding two or more rates of ozone production. As another example, the power circuitry may be configured to provide the ozone generating cell with an infinite number of power amounts along a continuously variable range, thus providing a corresponding infinite number of ozone production rates.

Some examples of the disclosed technology include an ozone generating cell that includes a first gas port, a second gas port, a power connection, and a corona discharge chamber. The discharge chamber has a curved side wall. In some cases, the curved side wall may be a cylindrical side wall. The chamber further includes a high-voltage electrode that is electrically coupled to the power connection. The chamber also includes a ground electrode and a dielectric material positioned between the high-voltage electrode and the ground electrode. The dielectric material has an opening that is in fluid communication with the first gas port. A gas channel is formed between the dielectric material and the ground electrode for gas to flow through during a corona discharge. In some cases, the gas channel has a first end that is in fluid communication with the gas opening in the dielectric material and a second end in fluid communication with the second gas port. The gas channel also includes a plurality of concentric segments. In some cases, the concentric segments are connected to form a single, elongated flow path that extends from the opening in the dielectric material to an opening at an edge of the dielectric material. The channel opening is in fluid communication with the second gas port.

Examples of the disclosed technology directed to ozone generating cells may in some cases include a single dielectric material positioned between a high-voltage electrode and a ground electrode. Other examples may include multiple dielectrics. As an example, in some cases an ozone generating cell includes two ground electrodes positioned on opposite sides of a high-voltage electrode. A first dielectric plate is positioned between the high-voltage electrode and one of the ground electrodes and a second dielectric plate is positioned between the high-voltage electrode and the other one of the ground electrodes. Such a cell may in some cases include one or more gas channels. As an example, in some cases a first gas channel is formed between the first dielectric plate and the first ground electrode and a second gas channel is formed between the second dielectric plate and the second ground electrode.

Figure 1:
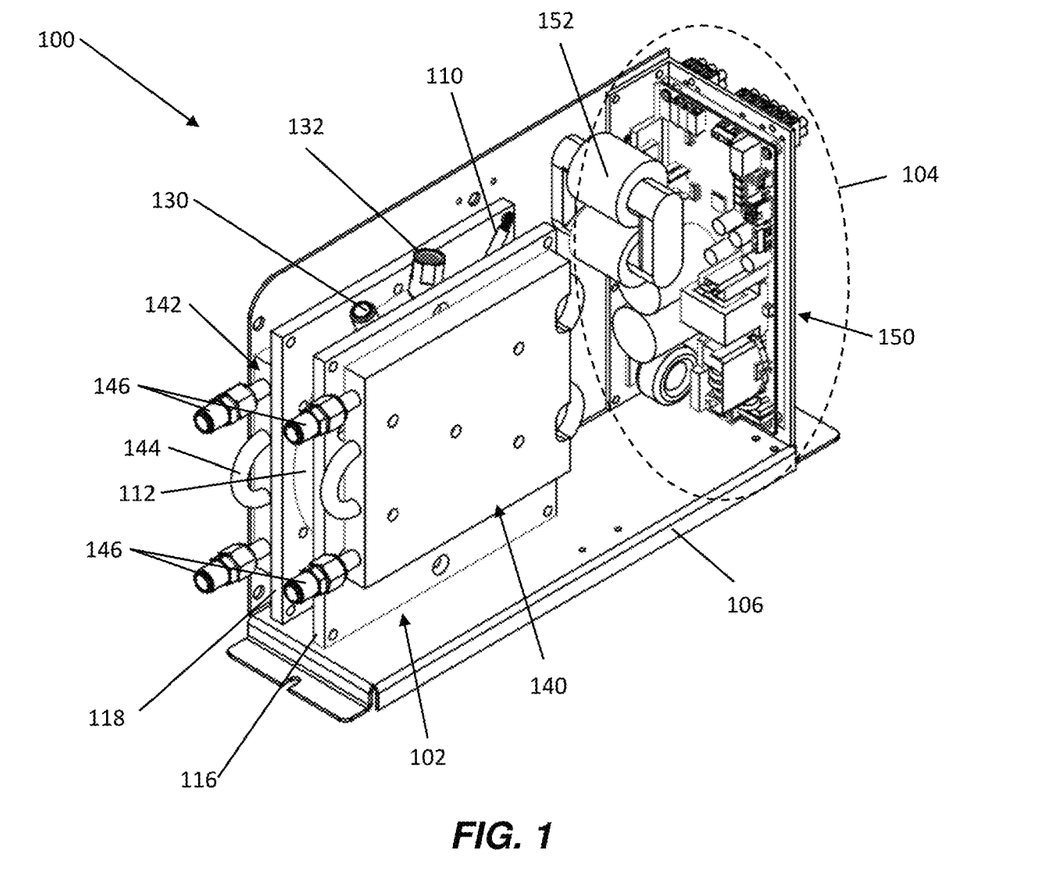
FIG. 1 is a perspective view of an ozone generator according to some embodiments.
Figure 2:
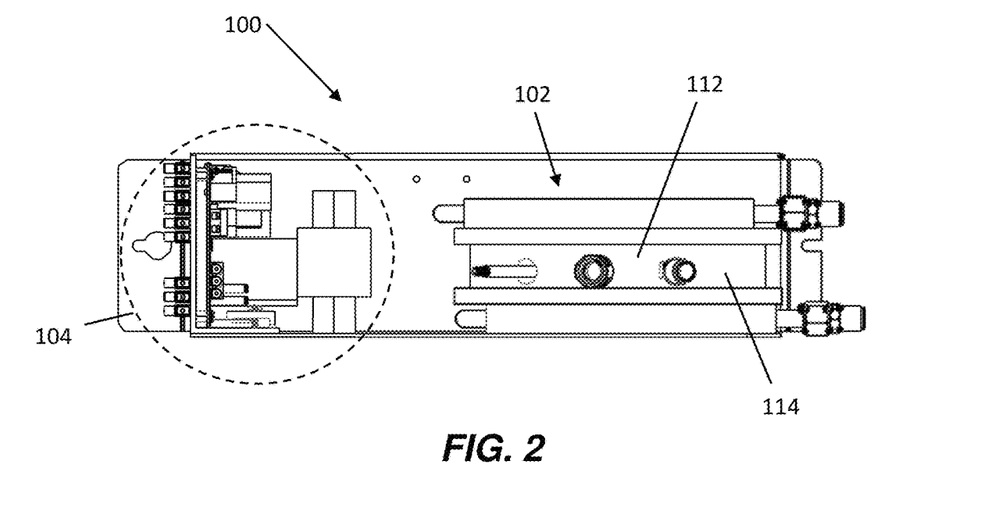
FIG. 2 is a top view of the ozone generator of FIG. 1.
Figure 3:
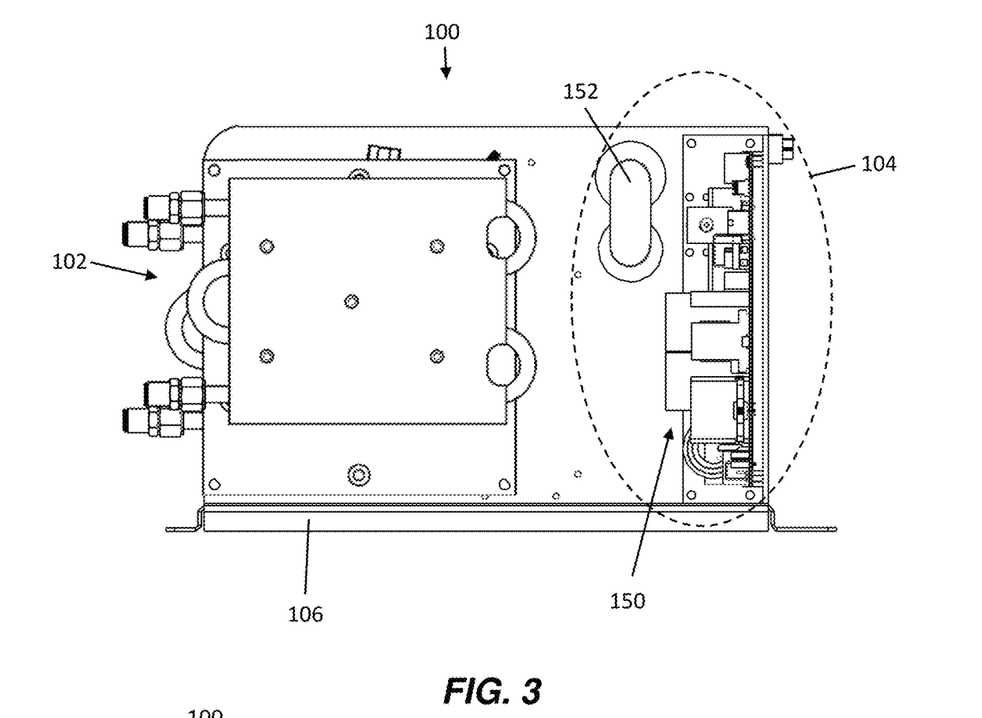
FIG. 3 is a first side elevation view of the ozone generator of FIG. 1.
Figure 4:
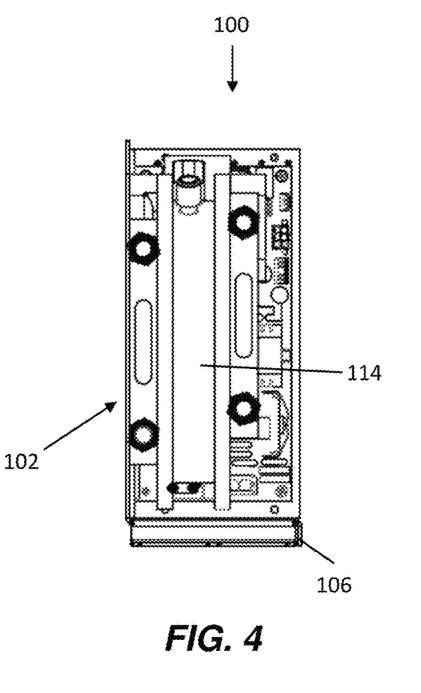
FIG. 4 is a first end view of the ozone generator of FIG. 1.
Figure 5:
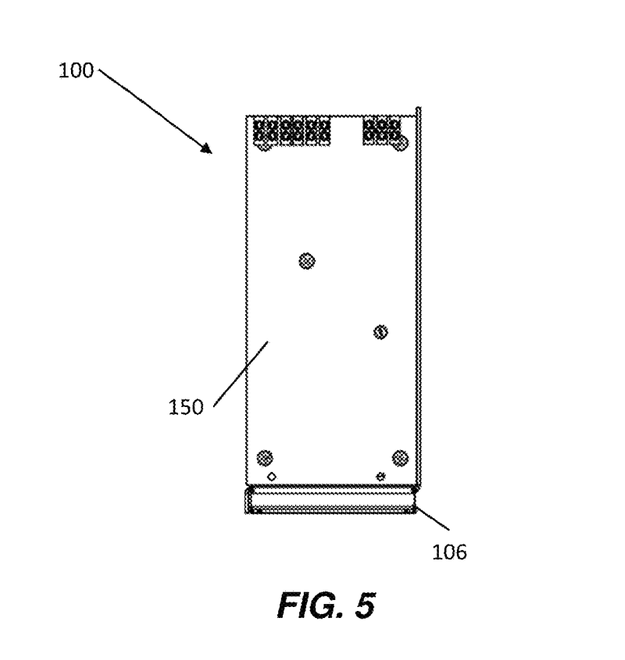
FIG. 5 is a second end view of the ozone generator of FIG. 1.
Figure 6:
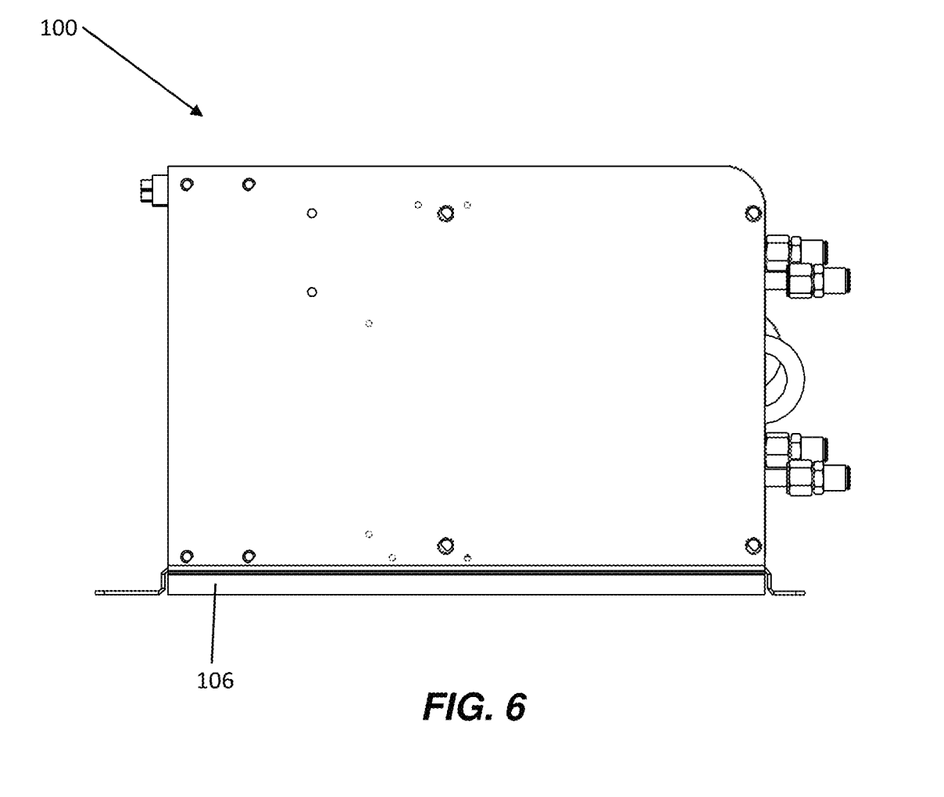
FIG. 6 is a second side elevation view of the ozone generator of FIG. 1.
Figure 7:
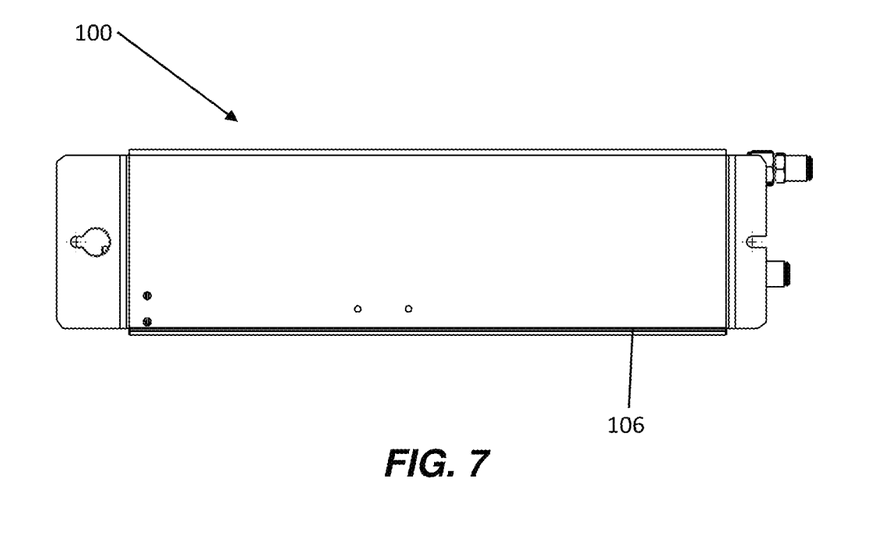
FIG. 7 is a bottom view of the ozone generator of FIG. 1.

Turning to the drawings, FIGS. 1-7 illustrate one example of an ozone generator 100 in accordance with various embodiments of the disclosed technology. The ozone generator in this example has an ozone generating cell 102 and power circuitry 104 mounted to a support frame 106. The ozone generating cell includes a power connection 110 electrically coupled to the power circuitry. The cell 102 further includes a corona discharge chamber 112 formed, in this example, by a curved side wall 114 bounded on each end by a ground electrode plate 116, 118. As shown in FIGS. 1, 2 and 4, in this example the curved side wall 114 is a cylindrical side wall. The cell power connection 110 extends through the side wall 114 along with a first gas port 130 and a second gas port 132. In some cases the first gas port 130 may be an inlet port that can be connected to a supply of a suitable gas (e.g., air, oxygen, dried air, etc.) and the second gas port 132 may be an outlet port that can be connected to an ozone dispersal system. In other cases, the first gas port may be an outlet port and the second gas port may be an inlet port.

As perhaps best shown in FIGS. 1-4, the ozone generating cell 102 in this example includes two cooling jackets 140, 142 mounted on opposite sides of the cell. In this case each cooling jacket includes coolant tubing 144 that extends back and forth through a heatsink mounted to one of the ground electrodes. In some cases, a source of coolant is connected to the tubing of each cooling jacket with the tubing connectors 146 shown in the figures. One example of a suitable coolant is water, though other known coolants can also be used. In some examples, the ozone generating cell 102 may not include cooling jackets and may instead be air-cooled with one or more fans and/or heat sink fins designed to more efficiently disperse the heat generated by the corona discharge chamber 112 during operation.

As shown in the drawings, the power circuitry 104 in this example takes the form of an electronic control board 150 in combination with a high-voltage transformer 152. According to some examples of the disclosed technology, the power circuitry 104 is configured to supply the ozone generating cell 102 with a variable amount of electrical power. Such a feature can be useful, for example, in order to generate one or more different amounts of ozone depending upon the details of a particular application. As an example, in some cases the power circuitry 104 is configured to supply the ozone generating cell 102 with more than 600 watts of electricity. In some examples the power circuitry is configured to supply the ozone generating cell with between 600 watts and 1200 watts of electricity.

In some cases, the power circuitry 104 is configured to supply different amounts of electrical power by modulating the pulse width of the energy signal. In some cases, the power circuitry 104 includes a dynamic pulse width modulator that is configured to supply power at two or more duty cycles. In some examples power may be provided using one or more of the following duty cycles: 20%, 50%, 80%, and 100%.

The ozone generating cell 102 is configured to generate an amount of ozone depending upon the amount of power supplied by the power circuitry 104. According to various embodiments, the power circuitry may be configured to provide a continuous range of electrical power to the ozone generating cell. In such examples, the ozone generating cell may produce ozone at a corresponding continuous range of output rates. In some examples, the power circuitry may be configured to provide a discrete number of electrical power settings within a particular range. In these types of examples, the ozone generating cell and the power circuitry are configured to generate ozone at two or more discrete rates. In some cases, the ozone generator 100 may be configured to produce ozone at rates that include at least two of 40 grams/hour of ozone, 60 grams/hour of ozone, and 100 grams/hour of ozone.

According to some examples of the disclosed technology, the power circuitry 104 may be configured to vary the frequency of the electrical power supplied to the ozone generating cell 102. In some examples the power circuitry is configured to supply power to the cell at one of three frequencies. In some cases, electrical power may be supplied at one or more of the following frequencies: 20,408 Hz, 22,222 Hz, and 24,390 Hz.

In some cases, the power circuitry 104 is configured to vary both the frequency and the amount of the electrical power supplied to the ozone generating cell 102.

Figure 8:
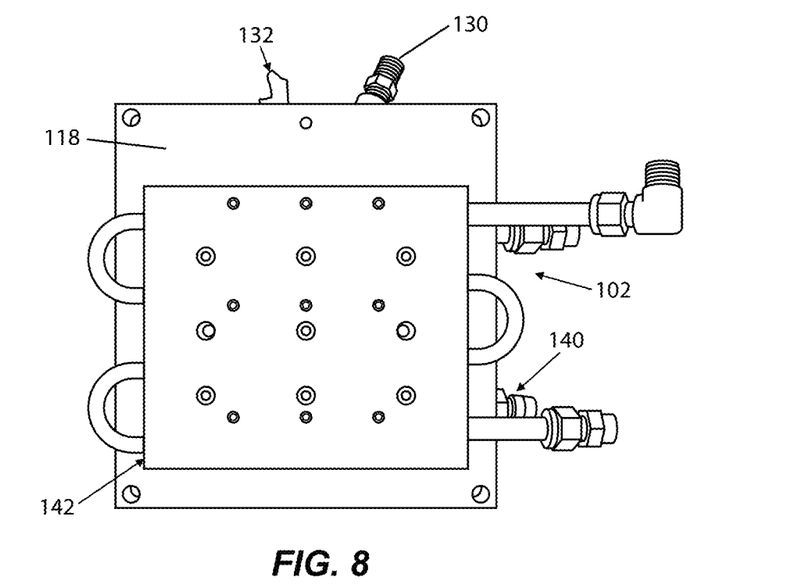
FIG. 8 is a first side elevation view of an ozone generating cell and cooling apparatus according to some embodiments.

Turning to FIGS. 8-14, several views of one example of an ozone generating cell 102 are provided in accordance with various embodiments of the disclosed technology. The cell 102 in this example includes a corona discharge chamber 112 formed by a curved side wall 214 and two ground electrodes 116, 118 on each end of the chamber 112. The cell 102 also includes a power connection 210 and first and second gas ports 130, 132 that extend through the side wall into the interior of the corona chamber 112. As shown in FIG. 8, in this example the ozone generating cell 102 includes a cooling apparatus that includes a first cooling jacket 240 and a second cooling jacket 142 mounted on opposite sides of the cell 102, as in the example embodiment illustrated in FIGS. 1-7.

As will be discussed, the example ozone generating cell depicted in FIGS. 8-14 includes a stack of chamber components that includes, in order, a first ground electrode 116, a first dielectric plate 260, a high-voltage electrode plate 262, a second dielectric plate 264, and a second ground electrode 118. The chamber stack further includes a first gas channel 270 formed between the first dielectric plate 260 and the first ground electrode 116 and a second gas channel 280 formed between the second dielectric plate 264 and the second ground electrode 118. It should be appreciated that this example of an ozone generating cell configured with two gas channels is only one of multiple possible configurations for an ozone generating cell in accordance with the disclosed technology. As another example, in some cases an ozone generating cell may only include a single gas channel formed between a single dielectric plate and a single ground electrode.

Figure 9:
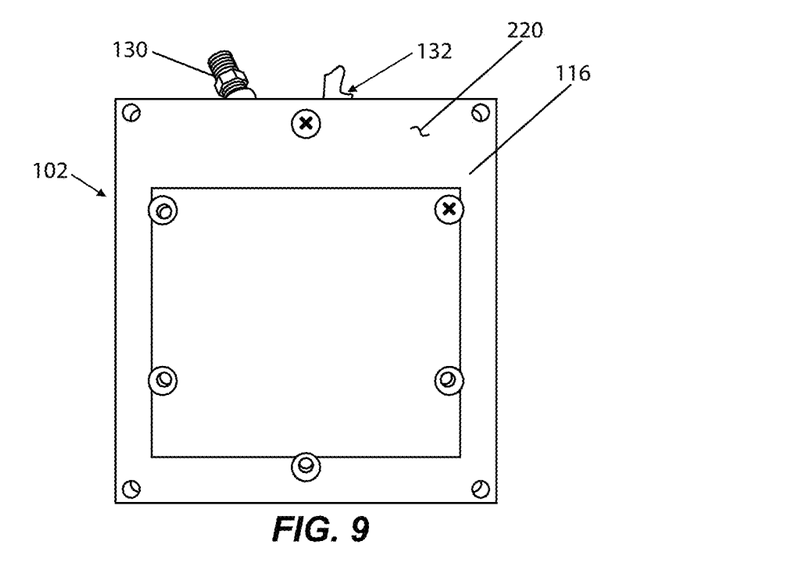
FIG. 9 is a second side elevation view of the ozone generating cell of FIG. 8 with the cooling apparatus removed.

Returning to the figures, FIG. 9 is a second side elevation view of the ozone generating cell 102 with the cooling apparatus removed. As shown in FIGS. 8-9, in this example screws and screw holes are used to mount the cooling jackets 240, 142 to the ground electrodes 116, 118 respectively, on each side of the ozone generating cell 102, though other fastening techniques may be used. As illustrated in FIGS. 8-9, in this example the ground electrodes 116, 118 are formed as metal plates and may comprise one or more metals or metal alloys. In some cases, the ground electrodes are formed from aluminum, stainless-steel, and/or alloys thereof.

Figure 10:
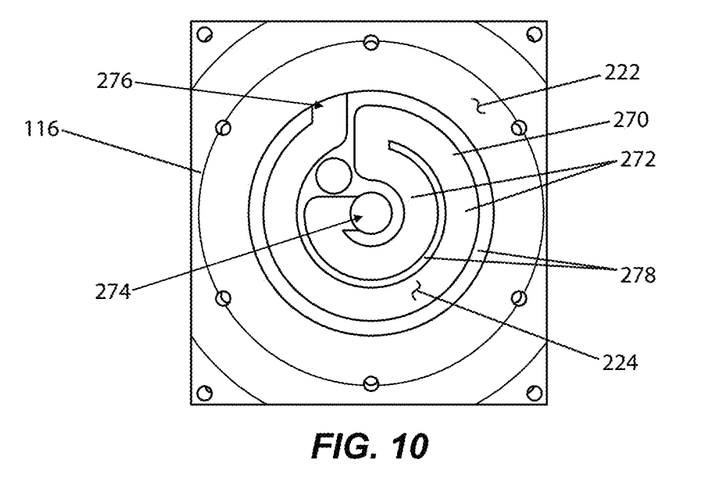
FIG. 10 is a view of a ground electrode and gas channel of the ozone generating cell of FIG. 8.
Figure 11:
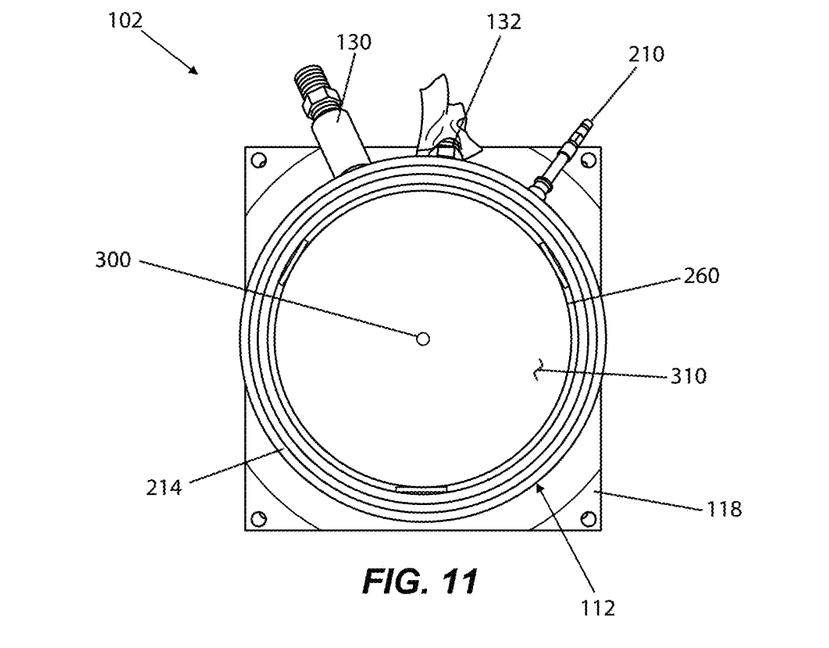
FIG. 11 is a top view of the ozone generating cell of FIG. 8 with a ground electrode removed to reveal a first dielectric plate.

FIG. 9 depicts a first, outer-facing surface 220 of the first ground electrode 116, while FIG. 10 depicts a second, inner-facing surface 222 of the first ground electrode 116 that faces the first dielectric (e.g., ceramic) plate 260 of the illustrated cell 102 when assembled. FIG. 11 is a top view of the ozone generating cell 102 with the first ground electrode 116 removed to reveal the first dielectric plate 260. FIG. 10 also provides a view of the first gas channel 270 formed against the second surface 222 of the first ground electrode 116. The first gas channel 270 includes multiple concentric segments 272 that extend between a first end 274 of the first gas channel and a second end 276 of the first gas channel. Multiple channel walls 278 along with portions 224 of the electrode surface 222 form the concentric segments of the channel.

In this example, the first end 274 of the channel 270 is located at a central location, which is also the center of the first ground electrode 116 in this embodiment and aligns with a gas opening 300 in the first dielectric plate 260 when the components are stacked together. The second end 276 of the channel 270 is located some radial distance away from the center, which in this case corresponds to an edge of the first dielectric plate 260 when the components are stacked together. When assembled, the first ground electrode 116 forms one side of the first gas channel 270, while the first dielectric plate 260 forms an opposite side of the first gas channel 270.

FIG. 11 also illustrates the cylindrical side wall 214 of the corona discharge chamber 112 in this example. As shown, this curved side wall 214 combines with the first and second ground electrodes 116, 118 in this example to define the corona discharge chamber 112. The first gas port 130, the second gas port 132, and the power connection 210 extend through the side wall 214 into the interior of the chamber 112. It will be appreciated that stacking the first ground electrode 116 shown in FIG. 10 involves flipping the electrode plate over so that the first gas channel 270 faces a first surface 310 of the first dielectric plate 260, and then securing the first ground electrode 116 against the chamber side wall 214.

Figure 12:
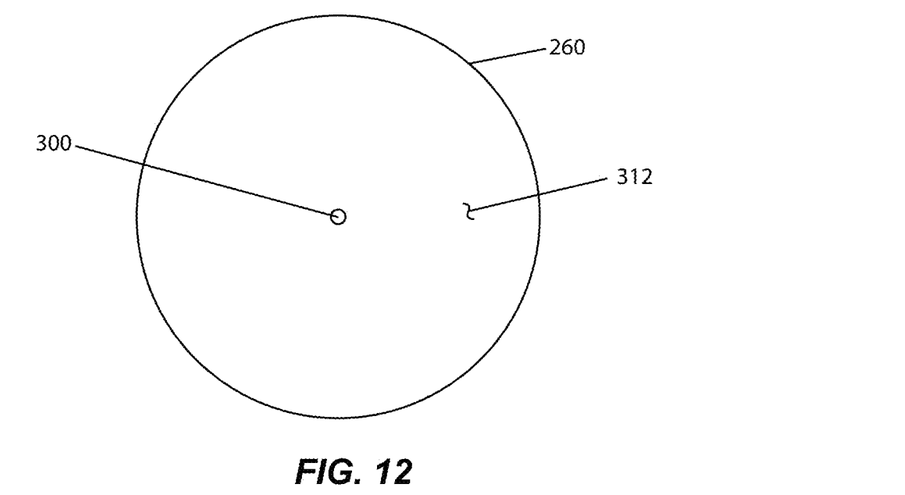
FIG. 12 is a view of an opposite side of the first dielectric plate of FIG. 11.
Figure 13:
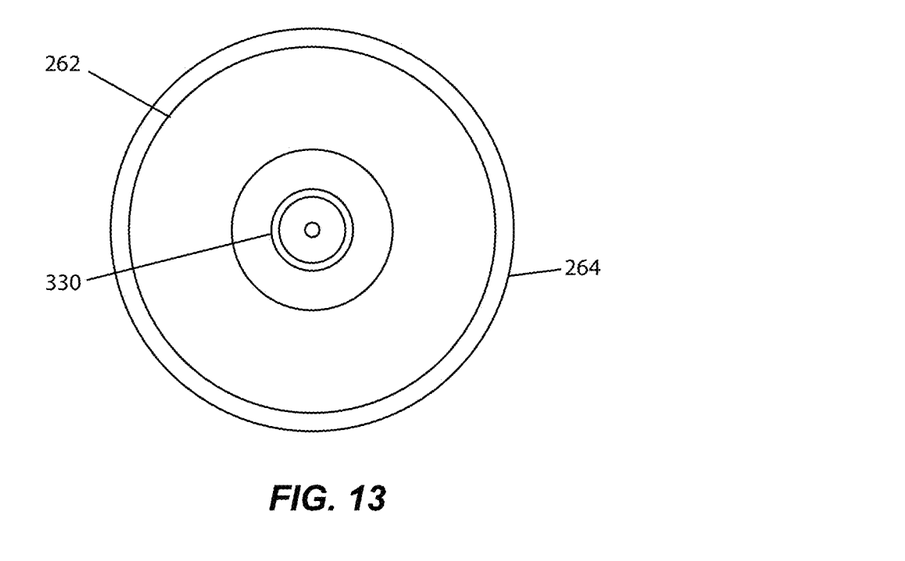
FIG. 13 is a top view of a high-voltage electrode coupled to a second dielectric plate according to some embodiments.
Figure 14:
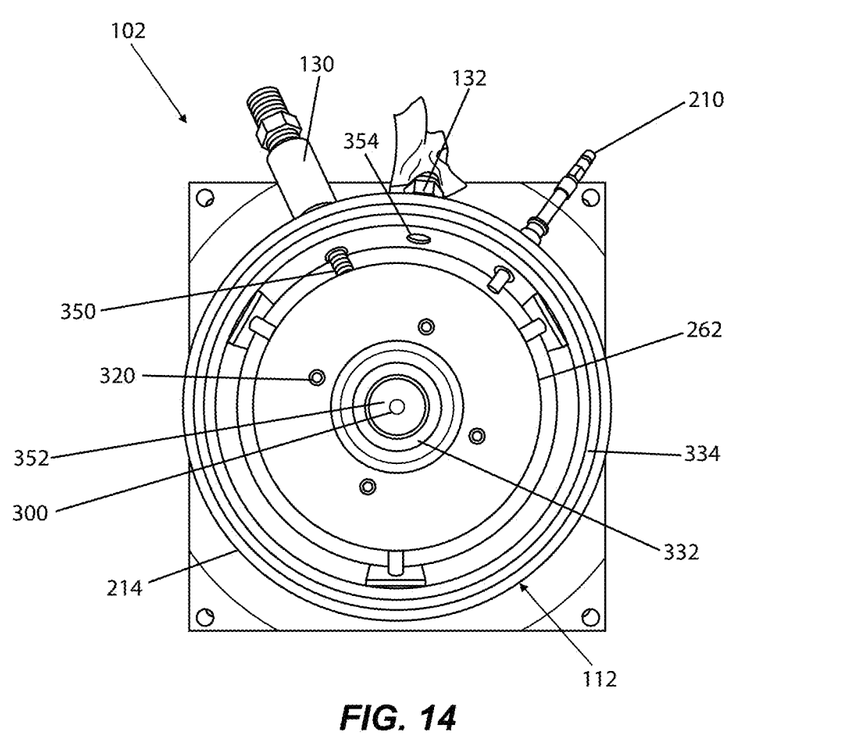
FIG. 14 is another top view of the ozone generating cell of FIG. 8 with the first dielectric plate removed to reveal the high-voltage electrode according to some embodiments.

FIG. 12 is a view of a second surface 312 of the first dielectric plate 260 opposite the first surface 310 shown in FIG. 11. The second surface 312 of the first dielectric plate 260 is positioned adjacent to the high-voltage electrode 262 when the chamber components are assembled. FIG. 13 is a top view of the high-voltage electrode 262 fastened to the second dielectric plate 264 according to this example. As shown in FIG. 14, in some cases multiple extensions 320, such as springs, between the high-voltage electrode 262 and the dielectric plates 260, 264 may locate the dielectric plates at a defined distance away from the high-voltage electrode, thus creating a discharge gap between the high-voltage electrode 262 and dielectric plates 260, 264.

According to some examples, the high-voltage electrode 262 is formed as a metal disk having an inner perimeter 330 and an outer circumference. In some cases, the high-voltage electrode is made from the same material as the ground electrodes, though a different material or combination of materials may be used. In some cases, the high-voltage electrode is made of aluminum or an aluminum alloy.

FIG. 14 is another top view of the ozone generating cell 102 with the first dielectric plate removed to reveal the high-voltage electrode 262 according to some embodiments. As is shown, the high-voltage electrode 262 is electrically coupled with the power connection 210, thus allowing connected power circuitry to supply the electrode 262 with high voltage electricity. As depicted, in some cases an inner seal 332, such as an O-ring or other gasket, is used around the inner perimeter 330 of the high-voltage electrode 262 and an outer seal 334 is used around the inside of the corona chamber wall 214 in order to seal the flow of gas to within the interior of the chamber 112.

In this illustrated example, a gas passage 350 (e.g., a tube, pipe, or other conduit) extends from the first gas port 130. Although not shown, this gas passage 350 extends through the high-voltage electrode 262 to a central void 352 formed in part by the inner perimeter 330 of the electrode 262. Thus, the gas passage 350 provides fluid communication between the first gas port 130 and the central void 352, and thus also with the gas openings 300 in the first and second dielectric plates 260, 264 that also define the central void 352. According to the illustrated example, the second gas port 132 can be seen to generally open into the interior of the discharge chamber 112 through a port opening 354. This enables the second gas port 132 to be in fluid communication with the second ends of the first and second gas channels, which are also in fluid communication with the interior of the discharge chamber 112.

According to some embodiments, the first gas port 130 may be considered a gas inlet and the second gas port 132 may be considered a gas outlet. In such cases, a feed gas such as ambient or dried air or oxygen is fed into the first gas port 130, through the gas passage 350, and into the central void 352. The gas then flows through each gas opening 300 in the first and second dielectric plates 360, 364 and into the first and second gas channels 270, 274. Corona discharges between the high-voltage electrode 262 and the ground electrodes 116, 118 convert some percentage of this gas to ozone, which then fills the interior of the discharge chamber 112. The ozone-enriched gas then exits the cell 102 through the second gas port 132. While this is one possible flow pattern, in some cases the gas flow may be in the opposite direction. Thus, in these cases the feed gas enters the chamber through the second gas port, is enriched with ozone within the first and second gas channels and exits through the gas openings in the dielectric plates, through the gas passage, and out the first gas port.

Although the disclosure has been described with reference to preferred embodiments, persons skilled in the art will recognize that changes may be made in form and detail without departing from the spirit and scope of the disclosed apparatus, systems and methods.

What is claimed is:

1. An ozone generating cell, comprising:
   a. a first gas port;
   b. a second gas port;
   c. a power connection; and
   d. a corona discharge chamber comprising:
      i. a curved side wall;
      ii. a high-voltage electrode electrically coupled to the power connection;
      iii. a ground electrode;
      iv. a dielectric material comprising a gas opening in fluid communication with the first gas port, the dielectric material positioned between the high-voltage electrode and the ground electrode; and
      v. a gas channel formed between the dielectric material and the ground electrode, the gas channel comprising:
         a) a first end in fluid communication with the gas opening in the dielectric material;
         b) a second end in fluid communication with the second gas port; and
         c) a plurality of concentric flow paths connected together between the first end of the gas channel and the second end of the gas channel.

2. The ozone generating cell of claim 1, wherein the curved side wall forms a cylindrical side wall of the corona discharge chamber.

3. The ozone generating cell of claim 1, wherein the ground electrode is connected to the curved side wall and forms an end wall of the corona discharge chamber.

4. The ozone generating cell of claim 1, further comprising one or more channel walls, wherein the gas channel is defined by the dielectric material, the one or more channel walls, and the ground electrode.

5. An ozone generating cell, comprising:
   a. a first gas port;
   b. a second gas port;
   c. a power connection; and
   d. a corona discharge chamber comprising:
      i. a first ground electrode;
      ii. a second ground electrode;
      iii a curved side wall extending between the first ground electrode and the second ground electrode, thereby defining an interior of the corona discharge chamber;
      iv. a high-voltage electrode electrically coupled to the power connection;
      v. a first dielectric plate comprising a first gas opening in fluid communication with the first gas port, the first dielectric plate positioned between the high-voltage electrode and the first ground electrode;
      vi. a second dielectric plate comprising a second gas opening in fluid communication with the first gas port, the second dielectric plate positioned between the high-voltage electrode and the second ground electrode;
      vii. a first gas channel formed between the first dielectric plate and the first ground electrode, the first gas channel comprising:
         a) a first end in fluid communication with the first gas opening;
         b) a second end in fluid communication with the second gas port; and
         c) a plurality of concentric flow paths connected together between the first end of the first gas channel and the second end of the first gas channel; and
      viii. a second gas channel formed between the second dielectric plate and the second ground electrode, the second gas channel comprising:
         a) a first end in fluid communication with the second gas opening;
         b) a second end in fluid communication with the second gas port; and
         c) a plurality of concentric flow paths connected together between the first end of the second gas channel and the second end of the second gas channel.

6. The ozone generating cell of claim 5, wherein the curved side wall forms a cylindrical side wall of the corona discharge chamber.

7. The ozone generating cell of claim 5, wherein the first ground electrode forms a first end wall of the corona discharge chamber and the second ground electrode forms a second end wall of the corona discharge chamber.

8. The ozone generating cell of claim 5, further comprising one or more first channel walls and one or more second channel walls, wherein the first gas channel is defined by the first dielectric plate, the one or more first channel walls, and the first ground electrode, and wherein the second gas channel is defined by the second dielectric plate, the one or more second channel walls, and the second ground electrode.

9. An ozone generator, comprising:
   a. a support frame;
   b. an ozone generating cell mounted to the support frame, the ozone generating cell comprising:
      i. a first gas port;
      ii. a second gas port;
      iii. a power connection; and
      iv. a corona discharge chamber comprising:
         a) a curved side wall;
         b) a high-voltage electrode electrically coupled to the power connection;
         c) a ground electrode;
         d) a dielectric material comprising a gas opening in fluid communication with the first gas port, the dielectric material positioned between the high-voltage electrode and the ground electrode; and
         e) a gas channel formed between the dielectric material and the ground electrode, the gas channel comprising:
            i) a first end in fluid communication with the gas opening in the dielectric material;
            ii) a second end in fluid communication with the second gas port; and
            iii) a plurality of concentric flow paths connected together between the first end of the gas channel and the second end of the gas channel; and
   c. power circuitry mounted to the support frame, wherein the power circuitry is electrically coupled to the power connection of the ozone generating cell.

10. The ozone generator of claim 9, wherein the power circuitry is configured to supply the ozone generating cell with more than 600 watts of electricity.

11. The ozone generator of claim 9, wherein the power circuitry is configured to supply the ozone generating cell with between 600 watts and 1200 watts of electricity.

12. The ozone generator of claim 9, wherein the ozone generating cell is configured to generate an amount of ozone that varies depending upon an amount of power supplied by the power circuitry.

13. The ozone generator of claim 9, wherein the ozone generating cell and the power circuitry are configured to generate ozone at two or more rates.

14. The ozone generator of claim 13, wherein the two or more rates comprise at least two of 40 grams/hour of ozone, 60 grams/hour of ozone, and 100 grams/hour of ozone.

15. The ozone generator of claim 9, wherein the curved side wall forms a cylindrical side wall of the corona discharge chamber.

16. The ozone generator of claim 9, wherein the ground electrode is connected to the curved side wall and forms an end wall of the corona discharge chamber.

17. The ozone generator of claim 9, further comprising one or more channel walls, wherein the gas channel is defined by the dielectric material, the one or more channel walls, and the ground electrode.

18. The ozone generator of claim 9, wherein:
  a. the ground electrode is a first ground electrode and wherein the corona discharge chamber further comprises a second ground electrode, wherein the curved side wall extends between the first ground electrode and the second ground electrode, thereby defining an interior of the corona discharge chamber;
  b. wherein the dielectric material comprising the gas opening comprises a first dielectric plate comprising a first gas opening in fluid communication with the first gas port, wherein the first dielectric plate is positioned between the high-voltage electrode and the first ground electrode;
  c. wherein the corona discharge chamber further comprises a second dielectric plate comprising a second gas opening in fluid communication with the first gas port, wherein the second dielectric plate is positioned between the high-voltage electrode and the second ground electrode;
  d. wherein the gas channel is a first gas channel formed between the first dielectric plate and the first ground electrode, wherein the first end of the first gas channel is in fluid communication with the first gas opening; and
  e. wherein the corona discharge chamber further comprises a second gas channel formed between the second dielectric plate and the second ground electrode, the second gas channel comprising:
    i. a first end in fluid communication with the second gas opening;
    ii. a second end in fluid communication with the second gas port; and
    iii a plurality of concentric flow paths connected together between the first end of the second gas channel and the second end of the second gas channel.

19. A method of generating ozone, comprising:
varying an ozone generation rate of the ozone generator of claim 9 by varying the amount of power supplied to the ozone generating cell by the power circuitry.

20. The method of claim 19, further comprising:
varying the ozone generation rate of the ozone generator by varying a frequency of the power supplied to the ozone generating cell by the power circuitry.

* * * * *